Nov. 15, 1966    P. W. SCHIPPER    3,285,276
NON-MODULATING VALVE
Filed Feb. 14, 1964

INVENTOR.
Pieter W. Schipper
BY
Lazo & Barry
Attorneys

United States Patent Office 3,285,276
Patented Nov. 15, 1966

3,285,276
NON-MODULATING VALVE
Pieter W. Schipper, Elm Grove, Wis., assignor to Atwater-General Corp., Watertown, Wis., a corporation of Wisconsin
Filed Feb. 14, 1964, Ser. No. 345,010
8 Claims. (Cl. 137—408)

This application relates to a valve control device particularly of the non-modulating type.

In devices which operate in response to changes in the level of water within a container, modulation of the valve often occurs as the point of balance is reached between the maximum and minimum levels of the fluid. This is particularly significant in devices where the fluid level or weight changes slowly such as during evaporation and fills slowly as a result of the small motion of the valve between open and close. Unless some means is provided to positively move the valve to pull open and to seat the valve full closed, a small vibration or modulation will occur. This can be of particular importance where a calibration is required of the amount of fluid being used in the controlled apparatus.

One of the primary objects of the present invention is to provide a non-modulating valve.

Another object of the present invention is to provide a valve controlling mechanism which moves the valve from full closed to full open to full closed with a positive motion.

A still further object of the present invention is to provide a siphon actuated device for controlling the motion of a valve.

Another object of the present invention is to provide a mechanical counterweight system to control a valve which is rugged in construction, simple in fabrication and low in cost.

A still further object of the present invention is to provide a valve control mechanism having means for determining the amount of fluid controlled.

A still further object of the present invention is to provide a non-modulating valve control device which utilizes the variation in weight of a device in or out of the fluid.

These objects are accomplished by positioning a float type element within a fluid chamber of predetermined volume having an inlet and an outlet. A valve stem is connected to the element to control the flow of fluid through the inlet depending on the position of the element in the chamber. The outlet is located at the lower end of the chamber and has an inverted U-shaped siphon tube connected to drain the fluid from the chamber whenever the inlet is closed. When the chamber is filled with fluid, the weight of the float element will be reduced and this change in weight is used to aid in unbalancing a counterweight system to open the fluid inlet. The inverted tube is designed to operate like a siphon draining fluid from the chamber whenever the inlet is closed. Once the chamber is drained, the full weight of the float element will again be applied against the valve so that it is fully closed. Since the volume of the chamber is known and is completely drained each time the valve is closed and the amount of fluid required to close the valve can be predetermined, the amount of fluid that will flow through the chamber each time it is opened and closed can be readily determined. A counter can be attached to the system to show the number of times the valve is opened and closed in a predetermined period of time.

Other objects and advantages will become more readily apparent when the following detailed specifications is read in conjunction with the accompanying drawings, in which.

Figure 1:
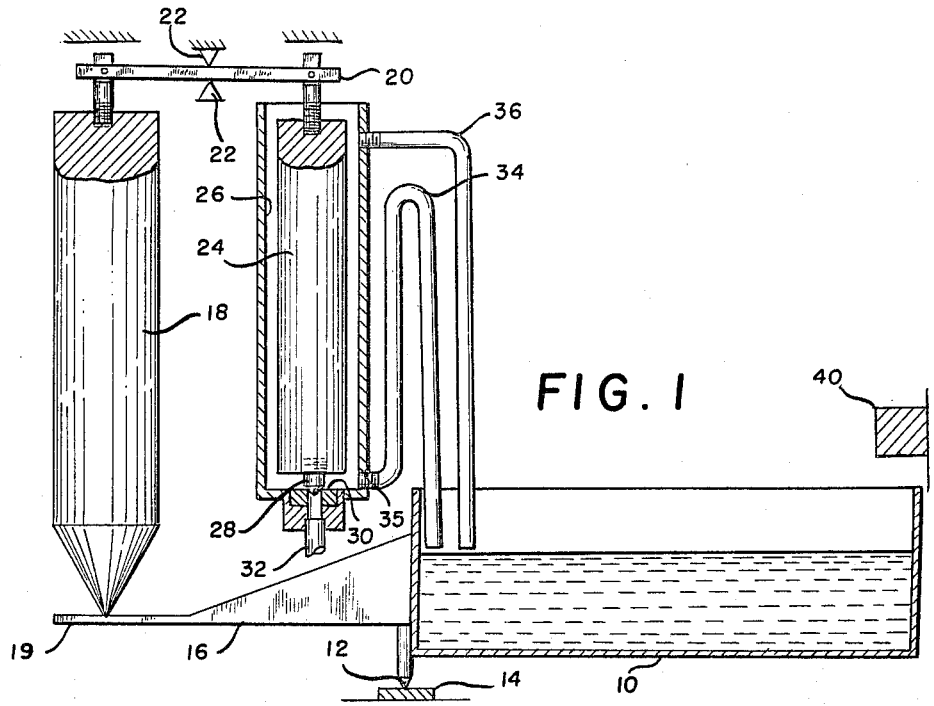
FIG. 1 is a view of the non-modulating valve adapted to respond to the motion of a water pan for a humidifier with the valve in a closed position.
Figure 2:
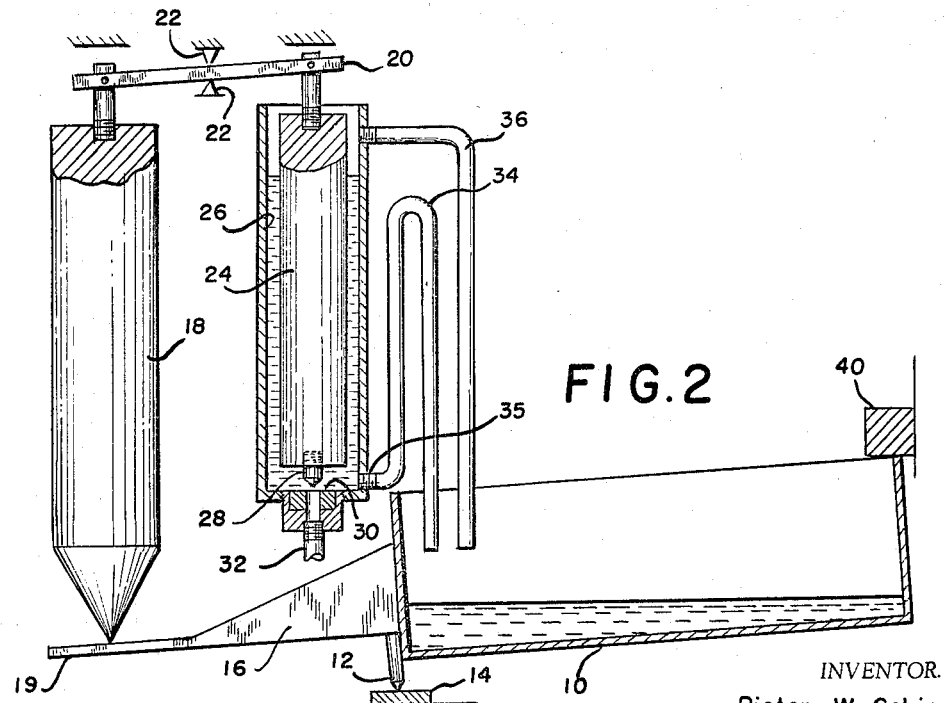
FIG. 2 is a view similar to FIG. 1 with the valve in the open position.

Referring more particularly to the drawings, the non-modulating valve is shown adapted to respond to the demands of a humidifier water pan. This arrangement is shown by way of example only since the valve control system can be used in other devices where fluid flow is slow. A fluid container or evaporating water pan 10 is shown mounted to pivot on a knife edge 12 resting on a fixed pivot block 14. A lever arm 16 extends outward from the knife edge and has a counterweight 18 acting on its outer end 19. Counterweight 18 is pivotally connected to lever arm 20 which is pivoted between fixed pivots 22. The opposite end of the lever arm extends outward from the fixed pivot and is pivotally connected to a valve actuator 24 which is positioned within chamber 26. Hereinafter, the term "balance means" is used to refer to the combination of the lever arms 16 and 20, the counterweight 18, the valve actuator 24, and the water pan 10.

The valve actuator shown is made from a metallic material but a float or a non-metallic actuator could be used if desired. A control valve 28 is secured to the end of the actuator and is positioned to engage valve seat 30 at the fluid inlet 32 to the chamber. A U-shaped tube 34 has one end connected to an outlet 35 at the lower end of the chamber and the other end positioned to discharge into the water pan at a point near the bottom of the chamber. The outlet 35 may be located slightly above the valve seat so that the valve seat is always under water, thus preventing the effects of corrosion. An overflow tube 36 may be connected to the top of the chamber if the rate of removal of the water from chamber 26 by tube 34 is less than the rate of flow of water into the chamber. In the full closed position shown in FIG. 1, the water pan is presumed filled with water to its upper limit and has its full weight acting on the counterweight. The weight of the water in the full pan will push the counterweight to its upper position causing lever arm 20 to rock on pivot 22, pushing the valve actuator against the valve seat 30 in the inlet 32. As water evaporates from the pan, the weight of the water will be reduced until it approaches the weight of the counterweight minus the loss in effective weight of the float actuator 24 at which time the pan will start to tilt on the pivot block. The slight gradual downward motion of the counterweight will pull lever arm 20 about pivot 22 pulling the float actuator upwards slightly and opening the fluid inlet to the chamber slightly, allowing water to enter the chamber. Since the effective weight of the valve actuator on the counterweight will be reduced due to the rise of water in the chamber, increased effective weight of the counterweight will act on the water pan, tilting it upward against limit stop 40. The valve actuator will be pulled upward, opening the valve in the inlet to its full opened position with a positive motion.

When the water in the chamber reaches the height of the upper U of siphon tube 34, the water in the chamber will start to flow through the tube into the pan. In the event the rate of water flow through the U tube is not equal to its rate of entry through the inlet, the overflow will flow through tube 36 to the water pan. Once the water pan fills sufficiently to overcome the effective weight of the first counterweight, it will start to tilt on the pivot block. This pivoting motion will slowly move the first counterweight upward pushing the valve actuator downward with the valve stem moving into engagement with the valve seat. This is the point when normally modulation or chatter will occur in the inlet valve. As the rate of flow of water into the chamber is reduced, the U tube will start to siphon water from the chamber at a faster rate than it is entering the chamber. The effective weight of the valve actuator on the counterweight will be increased in conjunction with the weight of the water entering the pan which will allow the valve actuator to close tightly against the valve seat.

The apparatus shown in the drawings is designed to fill a water pan for a humidifier. When the apparatus is in balance, the weight of counterweight 18 will be balanced against the combined weight of the valve actuator and the water in the water pan. Since the evaporation rate of the water in the pan is very slow, the downward motion of the counterweight will be slow and a constant opening and closing of the valve would normally occur, allowing a small amount of water to constantly refill the pan. In the present apparatus, the chamber must be filled with the water before the incoming water has any effect on the weight of the pan. As the chamber slowly fills with water, the effective weight of the valve actuator will be reduced, unbalancing the system. The counterweight will move downward pulling the valve actuator upward to open the inlet. Once the chamber is filled, the water will flow into the water pan through the two tubes until the weight of the water pan combined with the reduced weight of the valve actuator overcomes the weight of the counterweight. At this point, the water pan will start to tip back, pushing the counterweight upward and the valve actuator downward, slowly closing the inlet. Once the inlet is completely closed, the chamber will be drained completely by the siphon action of tube 34. When the chamber has been completely drained, the full weight of the valve actuator will again act on the lever arm so that a positive force will be applied to the valve at the inlet. It should be obvious that the amount of water added to the pan each time the valve is opened will be equal to the weight of the water in the chamber plus the weight difference between the weight of the valve actuator when the chamber is empty and the weight of the valve actuator when the chamber is full. This can be calculated so that a reading can be made of the amount of water evaporated based on how many times the valve is opened in a twenty-four hour period.

Although only one embodiment of the present invention is disclosed and described, it should be apparent that this valve can be used for many purposes other than humidifiers and can be designed in a number of different ways to accomplish the same result without departing from the scope of the appended claims.

What is claimed is:

1. A non-modulating valve system comprising a chamber having
    an inlet
    a float positioned in said chamber and controlling the flow of water through said inlet,
    said float having a different effective weight depending on the amount of water in the chamber,
    a siphon tube connected to said chamber to drain water from said chamber after it is filled and to empty the chamber of water whenever the inlet is closed,
    a container positioned to receive the water from said siphon,
    a pivot member,
    a lever arm connected to said container and lying on said pivot member,
    a counterweight mounted on said lever arm to tilt the container from a first to a second position,
    a second pivot member,
    a second lever arm pivoted on said second pivot member and connecting said counterweight and said float to provide an opposite motion to said float,
    whereby on removal of water from said container, the counterweight will tip the container and pull the float away from the inlet allowing water to enter the chamber, reducing the effective weight of the float on the counterweight causing the counterweight to pull the float to a full open position, the float being pushed to a closed position when the weight of the water in the container is sufficient to move the container from the second to a first position in opposition to the weight of the counterweight, the siphon tube draining the water from the chamber after the inlet has been closed.

2. A fluid flow control device comprising
    a chamber having a fluid flow inlet,
    balance means including a float member in said chamber adapted to control the flow of fluid through said inlet,
    a container for receiving said fluid flow from said chamber,
    said float member responding to changes in the fluid condition of said chamber,
    said float member also responding to changes in a fluid condition remote from said chamber and opening said inlet slightly when a minimum fluid condition is reached in said container,
    the further change in the fluid condition in said chamber causing a further response in the float member to open the inlet fully,
    and tube means for transferring fluid from said chamber when the chamber is filled,
    said float member closing said inlet when a maximum fluid condition is reached in said container,
    said tube means draining said chamber after the inlet is closed.

3. A fluid flow control device according to claim 2 wherein said float member is composed of a material having a different effective weight depending on the fluid condition of said chamber.

4. A fluid flow control device according to claim 3 wherein said balance means further includes a counterweight connected in opposition to the combined weight of the float member and container, whereby changes in the fluid condition of the chamber and container will cause corresponding changes in the position of the counterweight.

5. A fluid flow control device according to claim 4 wherein said tube means includes a siphon type tube connected to the bottom of the chamber.

6. A non-modulating valve system comprising
    a member having a fluid inlet,
    a float member positioned in said chamber and connected to control the flow of fluid through said inlet,
    a container for receiving said fluid flow from said chamber,
    said float member having a different effective weight depending on the amount of fluid in the chamber,
    balance means for imparting an inlet opening motion and an inlet closing motion to said float member,
    the inlet opening motion allowing fluid to enter the chamber which reduces the effective weight of the float member, thereby allowing the imparting means to move the float member to the full open position,
    tube means for transferring the fluid from the chamber when the chamber is filled,
    whereby said float member is moved in an inlet closing direction as fluid is collected in the container,
    said tube means draining the chamber of all fluid as the inlet is closed, whereby the full effective weight of the float member acts to close the inlet.

7. A non-modulating valve system according to claim 6, wherein said tube means comprises
    a siphon type tube which acts as an outlet tube when fluid entering the chamber reaches a predetermined level and operates as a siphon to drain the chamber when the flow of fluid into the chamber has been reduced below the discharge rate of the siphon acting tube.

8. A non-modulating valve system according to claim 7 wherein said balance means comprises
   a counterweight connected to said container and the float member to move the float member in an inlet opening direction when the fluid in the container reaches a predetermined minimum and to move the float member in an inlet closing direction when the fluid in the container reaches a predetermined maximum position.

References Cited by the Examiner

UNITED STATES PATENTS

| | | | |
|---|---|---|---|
| 1,265,207 | 5/1918 | Johnson | 137—343 |
| 1,878,817 | 9/1932 | Buehrer | 137—408 |
| 2,654,362 | 10/1953 | Scharf | 126—113 |
| 2,665,706 | 1/1954 | Hansen | 137—408 |
| 3,112,762 | 12/1963 | Reitman | 137—408 |

WILLIAM F. O'DEA, *Primary Examiner.*

ISADOR WEIL, *Examiner.*

D. MATTHEWS, *Assistant Examiner.*

UNITED STATES PATENT OFFICE
CERTIFICATE OF CORRECTION

Patent No. 3,285,276                                November 15, 1966

Pieter W. Schipper

It is hereby certified that error appears in the above numbered patent requiring correction and that the said Letters Patent should read as corrected below.

Column 1, line 19, for "pull" read -- full --; column 4, line 49, for "member" read -- chamber --.

Signed and sealed this 12th day of September 1967.

(SEAL)
Attest:

ERNEST W. SWIDER                                          EDWARD J. BRENNER
Attesting Officer                                            Commissioner of Patents